United States Patent [19]

Kohler

[11] 4,321,137

[45] Mar. 23, 1982

[54] APPARATUS FOR PROCESSING LIQUIDS SUCH AS WATER AND THE LIKE BY REVERSE OSMOSIS

[75] Inventor: Wolf-Ulrich Kohler, Krefeld, Fed. Rep. of Germany

[73] Assignee: Maschinenfabrik Buckau R. Wolf AG, Grevenbroich, Fed. Rep. of Germany

[21] Appl. No.: 120,853

[22] Filed: Feb. 11, 1980

[30] Foreign Application Priority Data

Feb. 26, 1979 [DE] Fed. Rep. of Germany ....... 2907429

[51] Int. Cl.³ ............................................. B01D 31/00
[52] U.S. Cl. .................................. 210/137; 210/321.1; 210/416.1; 210/433.2
[58] Field of Search ................ 210/652, 321.1, 433 M, 210/134, 137, 416.1

[56] References Cited

U.S. PATENT DOCUMENTS 3,493,495 2/1970 Mendelson ...................... 210/409 X
3,716,141 2/1973 Spatz ............................... 210/321.1

FOREIGN PATENT DOCUMENTS 2547446 4/1977 Fed. Rep. of Germany ...... 210/652

Primary Examiner—Frank A. Spear, Jr.
Attorney, Agent, or Firm—Michael J. Striker

[57] ABSTRACT

An apparatus for processing liquids such as water or the like by means of a reverse osmosis device has a main pump which provides an entrance pressure to the reverse osmosis device in connection with a throttle. In order to avoid any losses of energy, another pump is connected to the main pump. Via a rigid shaft, a turbine is connected to the other pump which turbine receives the high pressure located in the concentrate and releases it to the other pump.

6 Claims, 1 Drawing Figure

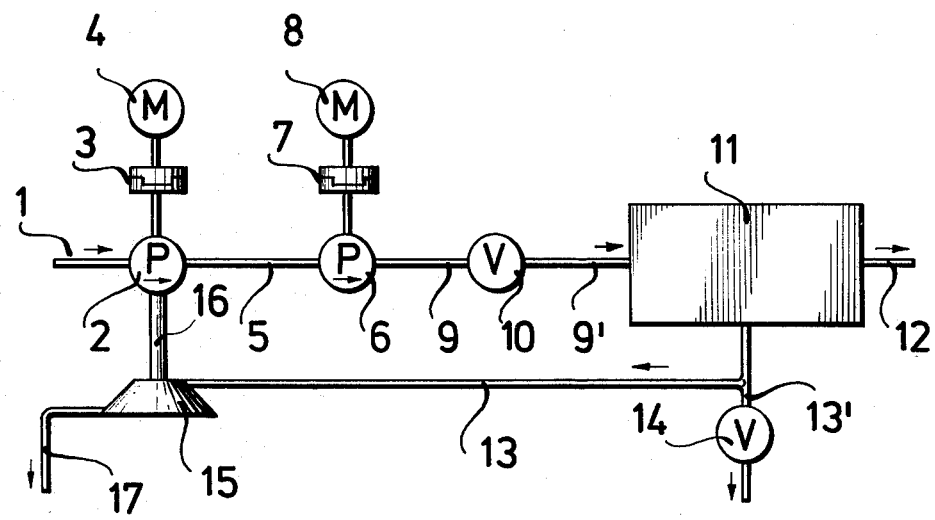

APPARATUS FOR PROCESSING LIQUIDS SUCH AS WATER AND THE LIKE BY REVERSE OSMOSIS

BACKGROUND OF THE INVENTION

The present invention relates to an apparatus for processing liquids such as water and the like by reverse osmosis.

In the art of processing liquids, it has been already proposed to use a reverse osmosis device for desalinization and decoloration of drinking water, industrial water or waste water as well as for upgrading of aqueous solutions and of waste waters in order to remove noxious matters. Furthermore, the reverse osmosis is employed in the recovering of metals during the concentrating of solutions.

Reverse osmosis is the transmuted natural principle of the osmosis utilized for technical applications.

In the osmosis, the equalization of different concentrations of solution occurs through semi-permeable membranes. The solution pressure of different concentrations is designated as osmotic pressure by which the water molecules try to dilute the concentrated solution. The osmotic process is terminated when an equilibrium is obtained.

In opposition to this, the reverse osmosis tries to counteract the dilution of the concentrating phase in order to achieve a further concentration wherein a higher pressure must be used than the present osmotic pressure. In this case, the semi-permeable membrane acts as a carrier for all dissolved substances so that a pure liquid the permeate is obtained at the outlet.

The pressure required for the reverse osmosis is produced by increasing the pressure, for example, by interposing a pump ahead of the reverse osmosis device. Although this principle seems to be sound, there is the disadvantage of a rather remarkable loss of energy since the pressure of the concentrate discharge is not utilized any more and therefore gets lost. This, however, undesirably increases the expenses of the apparatus.

The German specification DE-OS No. 2547446 describes method for purification of waste water solutions wherein the pressure energy in the concentrate is recovered by expanding the concentrate in a turbine which is directly connected to a pump. The disadvantage of the specification is, however, that the recovered energy is not sufficient to maintain or provide the required pressure for the solution to be treated when entering the reverse osmosis unit. Thus, the pump must be continuously in operation.

SUMMARY OF THE INVENTION

Accordingly, it is an object of the present invention to overcome the disadvantages of the prior art.

A more particular object of the invention is to provide an apparatus for processing liquid such as water and the like by using reverse osmosis wherein the energy located in the concentrate discharge is recovered and returned to the apparatus again.

Another object of the invention is to provide such an apparatus which is very simple and inexpensive in its construction.

A concomitant object of the invention is to provide such an apparatus as mentioned hereinbefore, which is highly reliable and requires only minimal servicing and upkeep.

Pursuant to the above objects and others which will become apparent hereafter, a feature of the invention resides in an apparatus for processing liquids by reverse osmosis which, briefly stated, comprises a first pump which is connected to the reverse osmosis device thereby achieving that the concentrate is introduced with a certain pressure, a turbine which is driven by the concentrate discharged from the reverse osmosis device, and a second pump which is connected to the turbine as well as to the first pump and being associated to a disconnectable motor.

Another feature of the present invention is that a rigid shaft connects the turbine with the second pump so that the disconnectible motor serves only as a starting motor. Therefore, the highly pressurized concentrate discharge releases its energy to the second pump via the turbine thereby recovering a major part of the energy for producing the pressure of the solution to be treated. Thus, the first pump has only to compensate the losses of operation and the losses from the reverse osmosis device.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a diagrammatic view of the apparatus according to the invention.

DESCRIPTION OF THE PREFERRED EMBODIMENT

The FIGURE illustrates an embodiment of the apparatus for processing liquids according to the present invention, wherein the concentrated solution is fed to a first pump 2 via an associated duct 1, the pump being driven by an electric motor 4 via a centrifugal clutch 3. Motor 4 is only used as a starting motor and can be discharged, for example through the centrifugal clutch 3. Outgoing from the pump 2 is a duct 5 which leads to a main or second pump 6 driven by a motor 8 via a clutch 7. From the main pump 6, there is outgoing a duct 9. For the purpose of optimization of the entire apparatus, the second pump 6, which is for example a centrifugal pump, is controllable in its speed so that the pressure of the solution to be treated is adjustable. Thus, a certain amount of concentrated solution having a certain pressure P1 is supplied to the duct 9 which is connected to a throttle 10 or the like, for example a bypass control, from which a duct 9' is leading to a reverse osmosis device 11. Through the throttle, the pressure P2 of the concentrated solution in the duct 9' is adjusted in such a manner that it corresponds to the required entrance pressure of the reverse osmosis device 11. It is to be noted that the arrangement of the pumps 2 and 6 is interchangeable. The pure water or the permeate is discharged in a depressurized state from the reverse osmosis device via a duct 12. Thus, for example 30% are discharged as depressurized permeate when considering the concentrated solution supplied to the device 11 as 100%. The remaining 70% of the solution are discharged from the device 11 as concentrate of high pressure via a duct 13 and are guided through a turbine 15 where a major part of the pressure energy located in the concentrate is received and released to the pump 2 via a rigid shaft 16 or the like connecting the turbine with the pump 2. The concentrate is discharged in a depressurized state through a duct 17. Furthermore, duct 13 is provided with a bypass duct 13' having a shutoff valve 14.

In a desalinization apparatus, concentrated solution having a pressure of $P2 = P1 - \Delta P1$ of approximately 60 to 70 bar is supplied to the reverse osmosis device 11 through the duct 9'. The concentrated solution leaves the reverse osmosis device 11 with a pressure of $P3 = P2 - \Delta P2$. Thus, 70% of this pressure energy are fed to the turbine 15 which recovers a major part of the energy and returns it to the cycle of the apparatus. Thus, the pump 6 has to compensate only losses of flow and losses of pressure occurring in the reverse osmosis device 11.

It will be understood that each of the elements described above, or two or more together, may also find a useful application in other types of constructions differing from the types described above.

While the invention has been illustrated and described as embodied in an apparatus for processing liquids such as water or the like, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An improved apparatus for processing a solution, such as waste water and the like by means of a reverse osmosis unit, having an inlet for the solution and two outlets for pure water and concentrate wherein the solution is conducted to the reverse osmosis unit by a first pump driven by a motor, the pressurized concentrate being expanded in a turbine which is connected to said first pump while the pure water is withdrawn in a pressureless state, the improvement which comprises: a second pump associated to said first pump and located between said first pump and said reverse osmosis unit, the second pump being connected to an individual motor via a clutch, wherein the motor of said first pump is connected thereto via a disengageable clutch.

2. An apparatus as defined in claim 1, wherein the motor of the first pump is working only as starting motor.

3. An apparatus as defined in claim 1, wherein the second pump has such a power as to compensate the losses of operation and losses of the reverse osmosis device.

4. An apparatus as defined in clam 3, wherein the speed of the second pump is controllable, the second pump being developed as centrifugal pump.

5. An apparatus as defined in claim 4, wherein the second pump is driven by a motor developed as a direct current motor.

6. An apparatus as defined in claim 1, wherein a throttle is provided to control the pressure of the solution into the reverse osmosis unit.

* * * * *